US012785373B2

(12) United States Patent
Bentley

(10) Patent No.: US 12,785,373 B2
(45) Date of Patent: Nov. 3, 2026

(54) HIGH VOLTAGE CABLE CLEAT WITH INTEGRAL CABLE ROLLER

(71) Applicant: Panduit Corp., Tinley Park, IL (US)

(72) Inventor: Christopher Bentley, Darlington (GB)

(73) Assignee: Panduit Corp., Tinley Park, IL (US)

( * ) Notice: Subject to any disclaimer, the term of this patent is extended or adjusted under 35 U.S.C. 154(b) by 297 days.

(21) Appl. No.: 18/657,871

(22) Filed: May 8, 2024

(65) Prior Publication Data

US 2025/0350106 A1 Nov. 13, 2025

(51) Int. Cl.
*H02G 3/32* (2006.01)
*H02G 1/06* (2006.01)

(52) U.S. Cl.
CPC ................. *H02G 3/32* (2013.01); *H02G 1/06* (2013.01)

(58) Field of Classification Search
None
See application file for complete search history.

(56) References Cited

U.S. PATENT DOCUMENTS 2,355,742 A 8/1944 Morehouse
3,426,988 A * 2/1969 Bradshaw ................ H02G 1/04 248/68.1
3,602,467 A * 8/1971 Thomas ................... H02G 1/08 248/210
3,637,175 A * 1/1972 McElroy .................. H02G 1/08 248/55
4,907,782 A * 3/1990 Hoekstra .................. H02G 1/04 254/134.3 R
6,079,673 A 6/2000 Cox
6,109,561 A * 8/2000 Haines ................. B65H 49/325 242/598.3
6,612,516 B1 * 9/2003 Haines ................... B65H 54/70 254/326
6,672,567 B1 * 1/2004 Chembars ................ H02G 1/08 254/134.3 FT
7,130,521 B2 * 10/2006 McCrary .................. H02G 1/08 385/136
7,419,136 B2 * 9/2008 Martinez .................. H02G 1/08 254/390

(Continued)

FOREIGN PATENT DOCUMENTS

AT 14217 U1 6/2015
CH 704643 B1 10/2015

(Continued)

OTHER PUBLICATIONS

Original and Translation of CH704643 (Year: 2015).*

(Continued)

*Primary Examiner* — Timothy J. Dole
*Assistant Examiner* — Muhammed Azam
(74) *Attorney, Agent, or Firm* — Freda Li; Christopher S. Clancy; James H. Williams

(57) ABSTRACT

A high voltage cable cleat supports cables on a surface. The high voltage cable cleat includes a roller with a main body, a first end, and a second end. A roller axle is positioned within the roller. The roller axle extends beyond the first end and the second end of the roller. A roller mount receives the roller axle and supports the roller thereon. Lower clamps are rotatably mounted onto the roller axle. Upper clamps are secured to the lower clamps over the cables positioned thereon to form the high voltage cable cleat.

19 Claims, 13 Drawing Sheets

(56) References Cited

U.S. PATENT DOCUMENTS

| | | | | |
|---|---|---|---|---|
| 8,398,033 | B2 | 3/2013 | Booth | |
| 9,010,695 | B2 * | 4/2015 | Efraimsson | H02G 7/053 248/65 |
| 9,022,357 | B2 * | 5/2015 | Argyle | H02G 7/12 254/134.3 R |
| 9,080,698 | B2 | 7/2015 | Fukumoto | |
| 9,106,069 | B2 | 8/2015 | Frizzell | |
| 9,353,892 | B2 | 5/2016 | Frizzell | |
| 9,404,605 | B2 * | 8/2016 | Booth | H02G 3/32 |
| 9,464,438 | B2 * | 10/2016 | Crary, II | H01B 17/16 |
| 9,551,438 | B2 | 1/2017 | Frizzell | |
| 9,587,433 | B2 * | 3/2017 | Sylvester | F16M 13/022 |
| 9,601,241 | B2 | 3/2017 | Dannenberg | |
| 9,774,177 | B1 * | 9/2017 | Avillan-Carrion | H02G 1/06 |
| 9,809,415 | B2 * | 11/2017 | Henderson | H02G 1/06 |
| 10,094,491 | B1 | 10/2018 | Crouse et al. | |
| 10,181,711 | B2 * | 1/2019 | Richardson, Jr. | H02G 7/125 |
| 10,266,122 | B2 * | 4/2019 | Rouleau | F16B 2/10 |
| 10,272,969 | B1 * | 4/2019 | Chen | B62M 3/086 |
| 10,407,985 | B2 * | 9/2019 | Sylvester | F16L 3/233 |
| 10,411,452 | B2 | 9/2019 | Varale | |
| 11,165,230 | B1 * | 11/2021 | Jordan | H02G 1/02 |
| 11,437,791 | B2 * | 9/2022 | Rouleau | H02G 3/0456 |
| 11,532,929 | B2 | 12/2022 | Robinson et al. | |
| 11,802,637 | B2 | 10/2023 | Koenig et al. | |
| 11,859,742 | B2 * | 1/2024 | Kruzel | F16B 21/02 |
| 2015/0353319 | A1 * | 12/2015 | Henderson | H02G 3/0456 248/68.1 |
| 2019/0379186 | A1 * | 12/2019 | Chitti Babu | H02G 3/0406 |
| 2021/0184445 | A1 | 6/2021 | Frizzell et al. | |
| 2023/0335981 | A1 | 10/2023 | Robinson et al. | |
| 2025/0350106 | A1 * | 11/2025 | Bentley | H02G 3/32 |
| 2026/0024967 | A1 * | 1/2026 | Rouleau | H02G 3/0456 |

FOREIGN PATENT DOCUMENTS

| | | | | | |
|---|---|---|---|---|---|
| CN | 103162016 | A | | 6/2013 | |
| CN | 218276035 | U | | 1/2023 | |
| DE | 3915451 | A1 | * | 11/1990 | G02B 6/545 |
| EP | 1973211 | B1 | | 5/2011 | |
| EP | 2806198 | B1 | | 11/2018 | |
| EP | 3588708 | A1 | | 1/2020 | |
| GB | 2210402 | B1 | | 2/1992 | |
| GB | 2318109 | A | | 4/1998 | |
| GB | 2361029 | B | | 6/2003 | |
| GB | 2389970 | B | | 5/2005 | |
| GB | 2405900 | B | | 7/2006 | |
| GB | 2514384 | B | | 6/2017 | |
| GB | 2574840 | B | | 7/2020 | |
| GB | 2604373 | A | | 7/2022 | |
| GB | 2585846 | B | | 8/2023 | |
| JP | 2014138517 | A | | 7/2014 | |
| KR | 20110024877 | A | * | 3/2011 | B65H 75/4402 |
| KR | 20150037350 | A | * | 4/2015 | F16L 3/015 |
| WO | 2013040237 | A1 | | 3/2013 | |
| WO | 2020001969 | A1 | | 1/2020 | |

OTHER PUBLICATIONS

Original and Translation of CN218276035 (Year: 2023).*

Ellis Patents, Ltd., Cable Guide Clamp Data Sheet, Oct. 18, 2022, 2 pgs.

Panduit Corp., High Voltage Cable Clamp Product Bulletin, Oct. 2023, 2 pgs.

* cited by examiner

HIGH VOLTAGE CABLE CLEAT WITH INTEGRAL CABLE ROLLER

FIELD OF THE INVENTION

The present invention relates to cable cleats, and more particularly to a high voltage cable cleat with an integral cable roller.

BACKGROUND OF THE INVENTION

The world is rapidly moving toward renewable energy sources, and the current electrical infrastructure will not be able to sustain the massive demands for more electricity. Efforts are increasingly being made worldwide to meet these new demands. A significant portion of the upgrades going forward will be carried out using large underground high voltage cables.

The installation of high voltage cables is an extensive, difficult process due to the sheer size and weight of the cables. Trenches are dug leading to the entry of tunnels. Large spools of cable are placed at the start of the trench and large rollers are placed throughout the trench. The cable is spooled out and pulled by heavy machinery along the rollers. Once the cables have reached entry, they are either pulled alongside of the installed cable cleats lining the tunnel (see FIG. 1) and lifted into the cleats via heavy machinery or pulled through the cleats, using external rollers placed ahead of time. In both methods, the cable cleat tops are removed, and then replaced once the cable is in position. Once the top portion of the cleat is bolted, the cable is secured and protected against a potential short circuit fault. Massive weight and therefore friction between the cleats and cable make the latter portion of the installation arduous. The process of removing and replacing the top cleats adds additional time to the process.

Current high voltage cable cleats are available in various configurations, materials, and sizes. Most cable cleats include two pieces, a top cleat and a bottom cleat secured together around the cable with one or two bolts. Current cable cleats fail to offer any assistance in improving the movement of cables through the cleats during installation. The current installation process requires extra equipment such as rollers, or machinery specific to tunnel projects to guide and assist in pulling the cable through. The extra machinery adds complications as well. The use of rollers adds to the cost and difficulty as well since the rollers takes time to set up and will regularly need to be maintained or replaced. The added difficulty of using rollers also proves to be time consuming.

It would be desirable to provide a cable cleat for high voltage applications capable of being used in a submerged installation. It would also be desirable to provide an improved cable cleat that facilitates the installation of cables.

SUMMARY OF THE INVENTION

The present invention is directed to a high voltage cable cleat used to support cables. The high voltage cable cleat includes a roller with a main body, a first end, and a second end. A roller axle is positioned within the roller. The roller axle extends beyond the first end and the second end of the roller. A roller mount receives the roller axle that extends beyond the roller. The roller mount supports the roller thereon. Lower clamps are rotatably mounted on the roller axle mounted to the roller mount and extending beyond the roller. Upper clamps are secured to the lower clamps over the cables positioned on the lower clamps to form the high voltage cable cleat.

DETAILED DESCRIPTION

Figure 1:
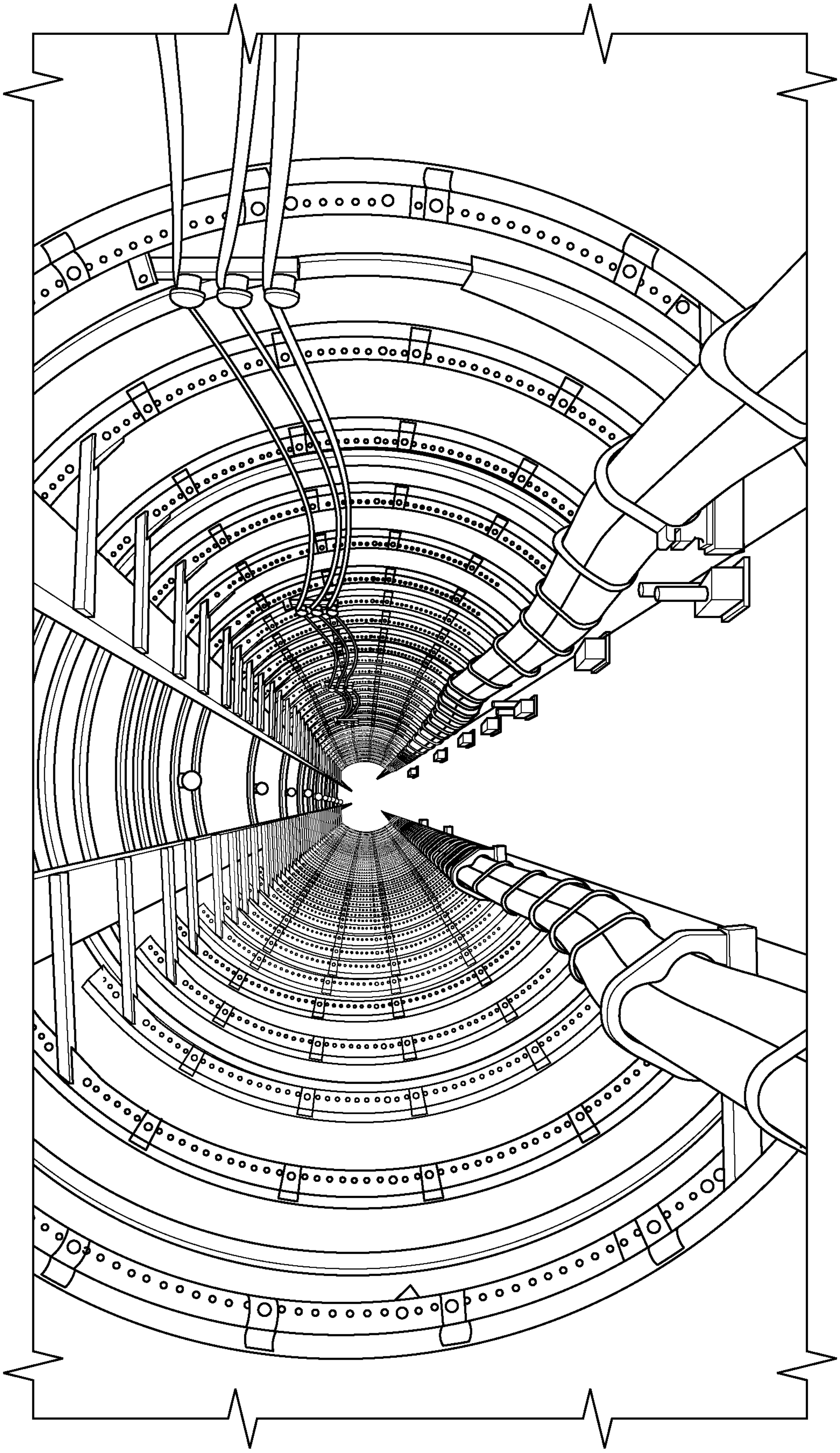
FIG. 1 (Prior Art)
FIG. 1 is a perspective view of prior art cleats for a trefoil cable configuration aligned and installed in a tunnel.
Figure 2:
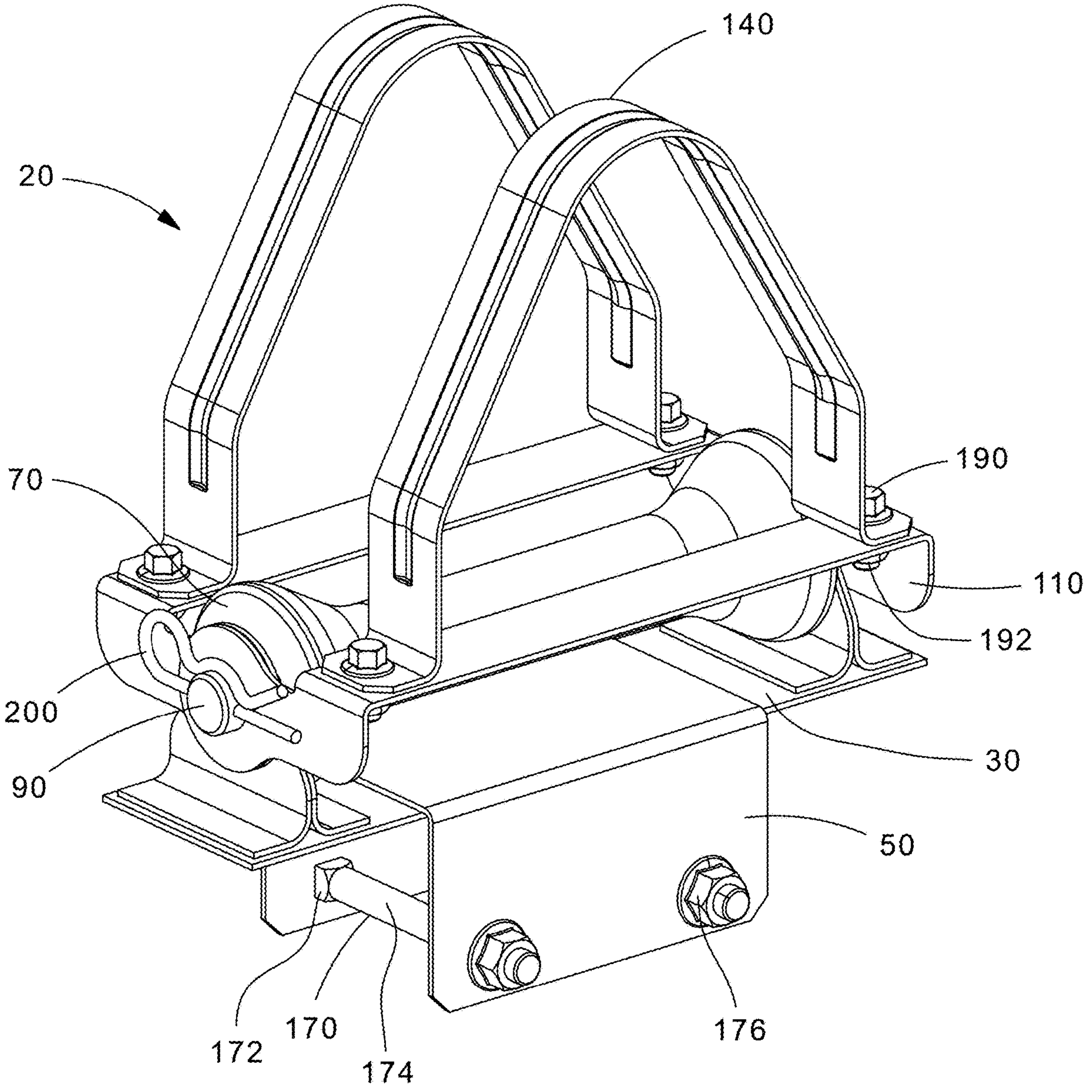
FIG. 2 is a perspective view of the high voltage cable cleat of the present invention.
Figure 12:
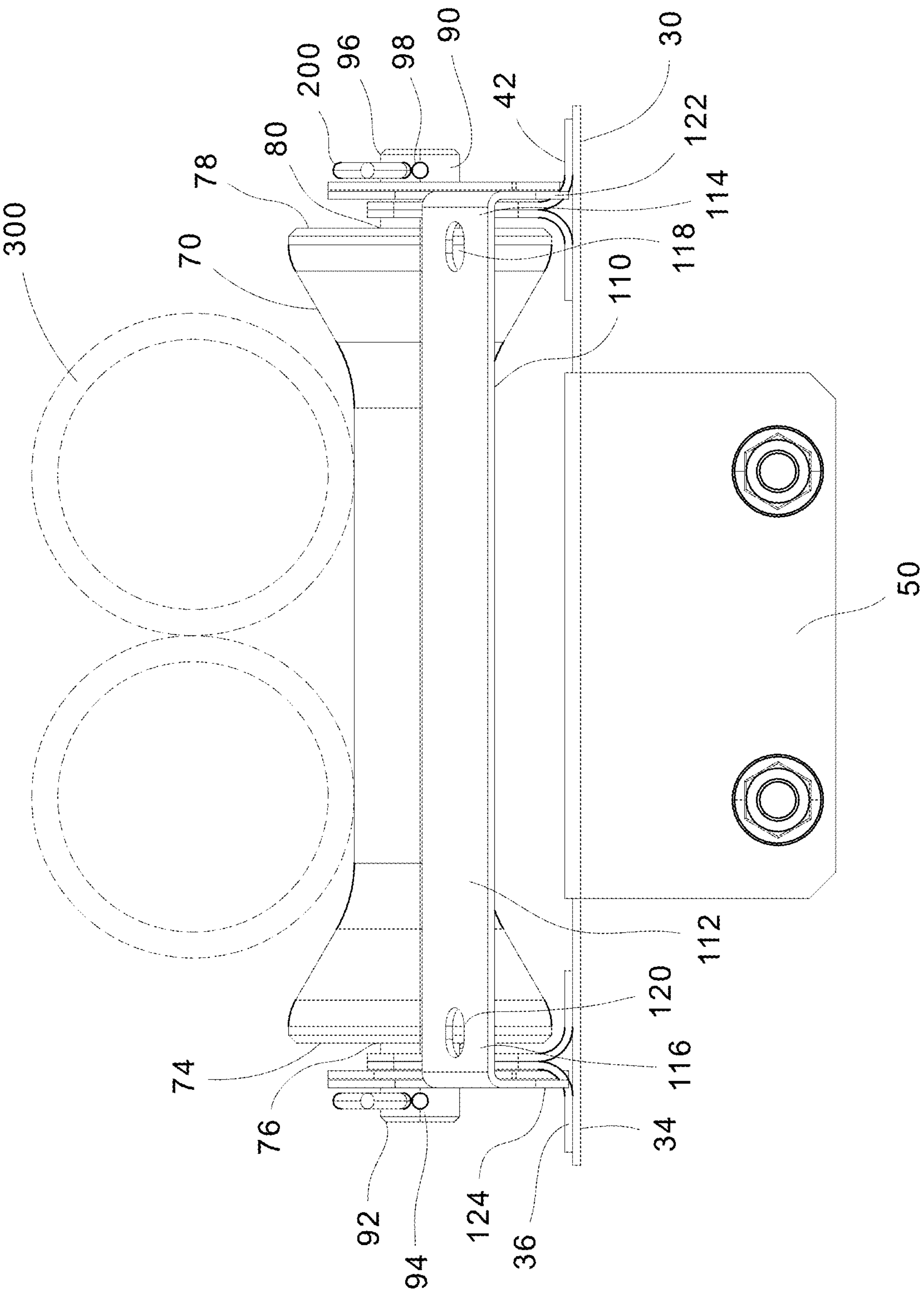
FIG. 12 is a front view of the high voltage cable cleat of claim 2 partially assembled with two cables positioned on the roller.
Figure 13:
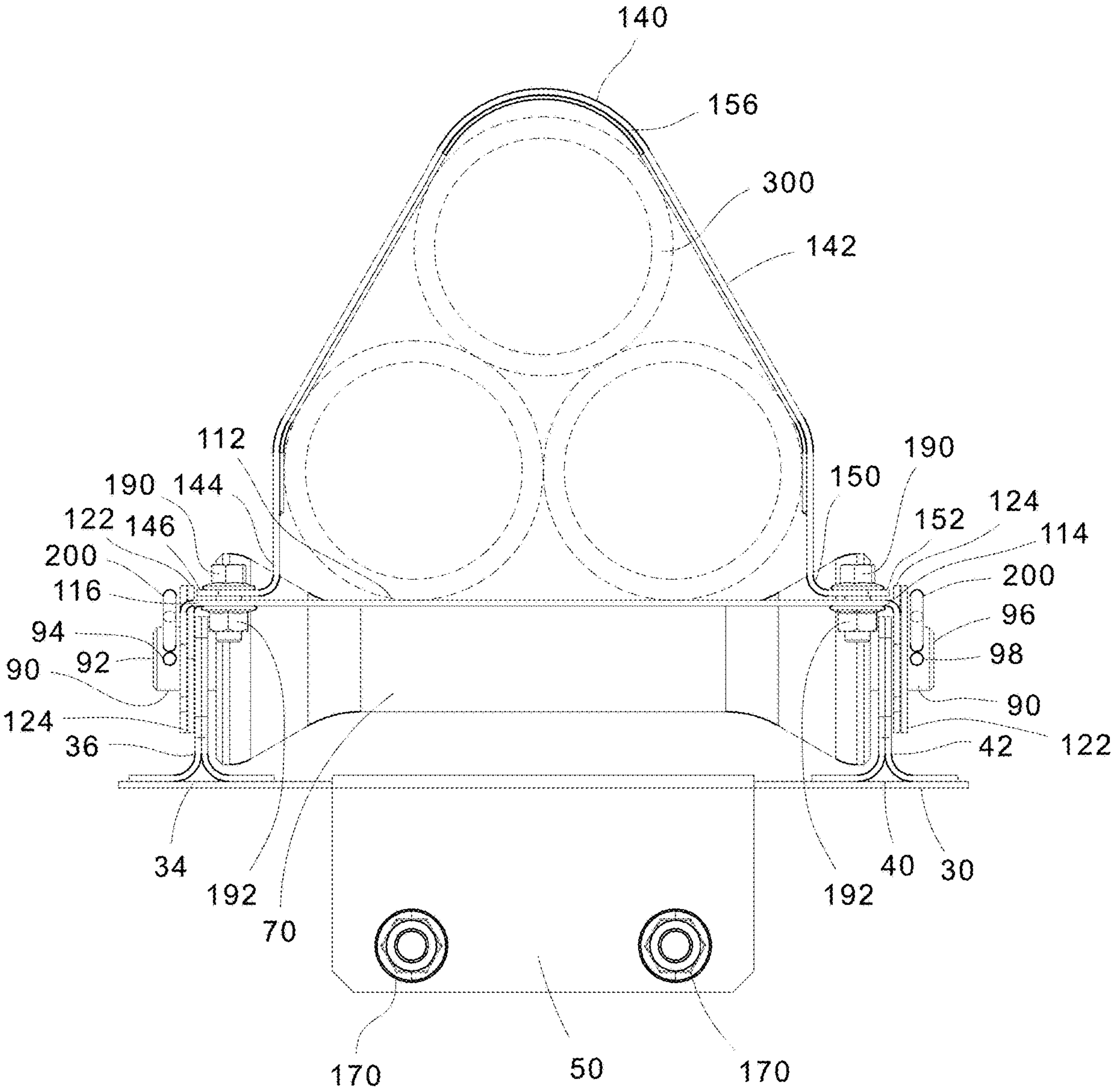
FIG. 13 is a front view of the high voltage cable cleat of FIG. 2 with a trefoil cable configuration installed on the cleat.
Figure 14:
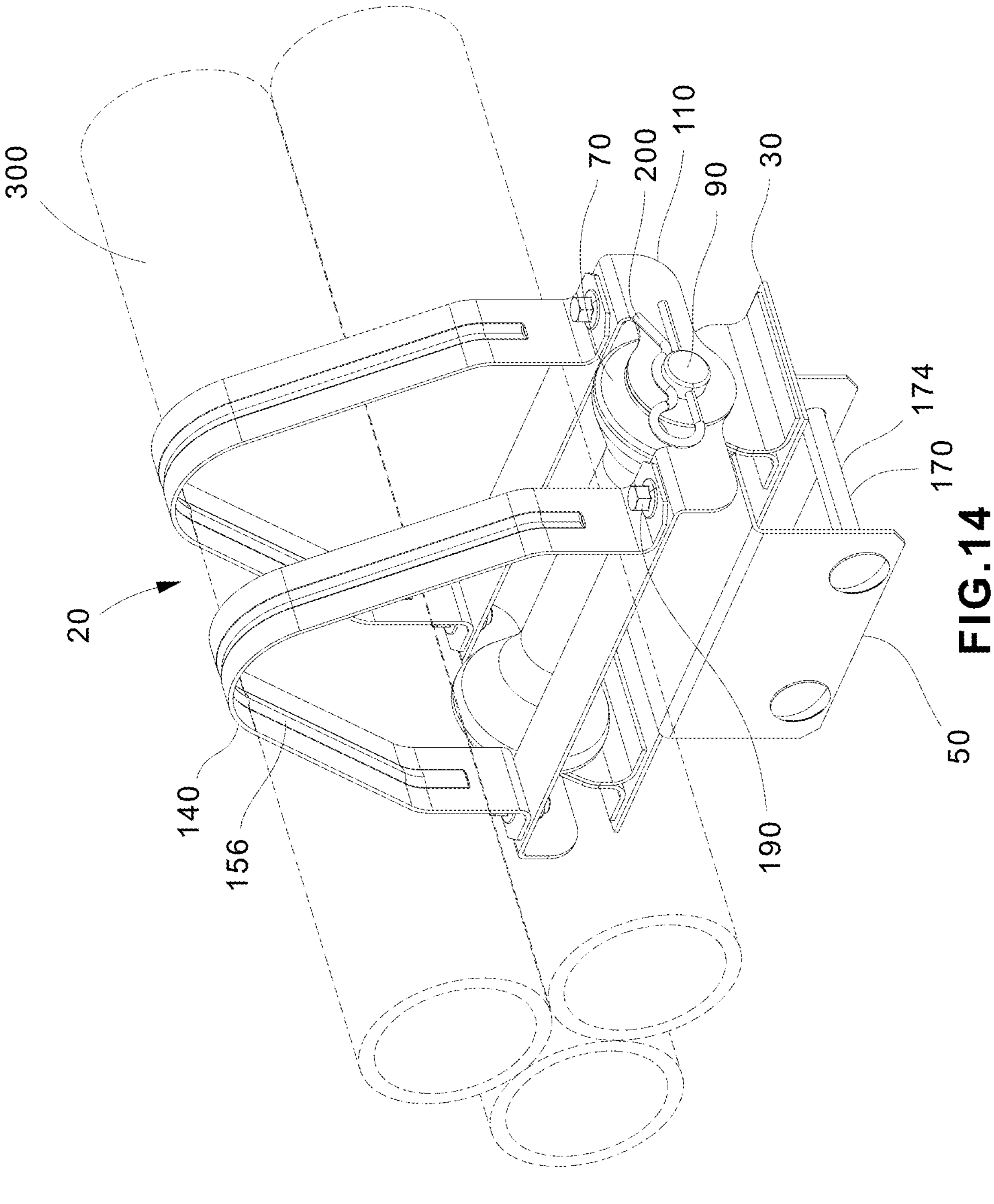
FIG. 14 is a perspective view of the high voltage cable cleat of FIG. 13 with trefoil cable configuration installed on the cleat.

FIG. 2 illustrates the high voltage cable cleat 20 of the present invention. The cable cleat 20 is appropriately sized for specific cable diameters and has softened edges in all potential cable contact areas. As described below, the cable cleat 20 is rotated from an initial position that facilitates cable installation (FIGS. 11-12) to an installed position with upper clamps 140 positioned over the cables 300 (FIGS. 13-14).

Figure 3:
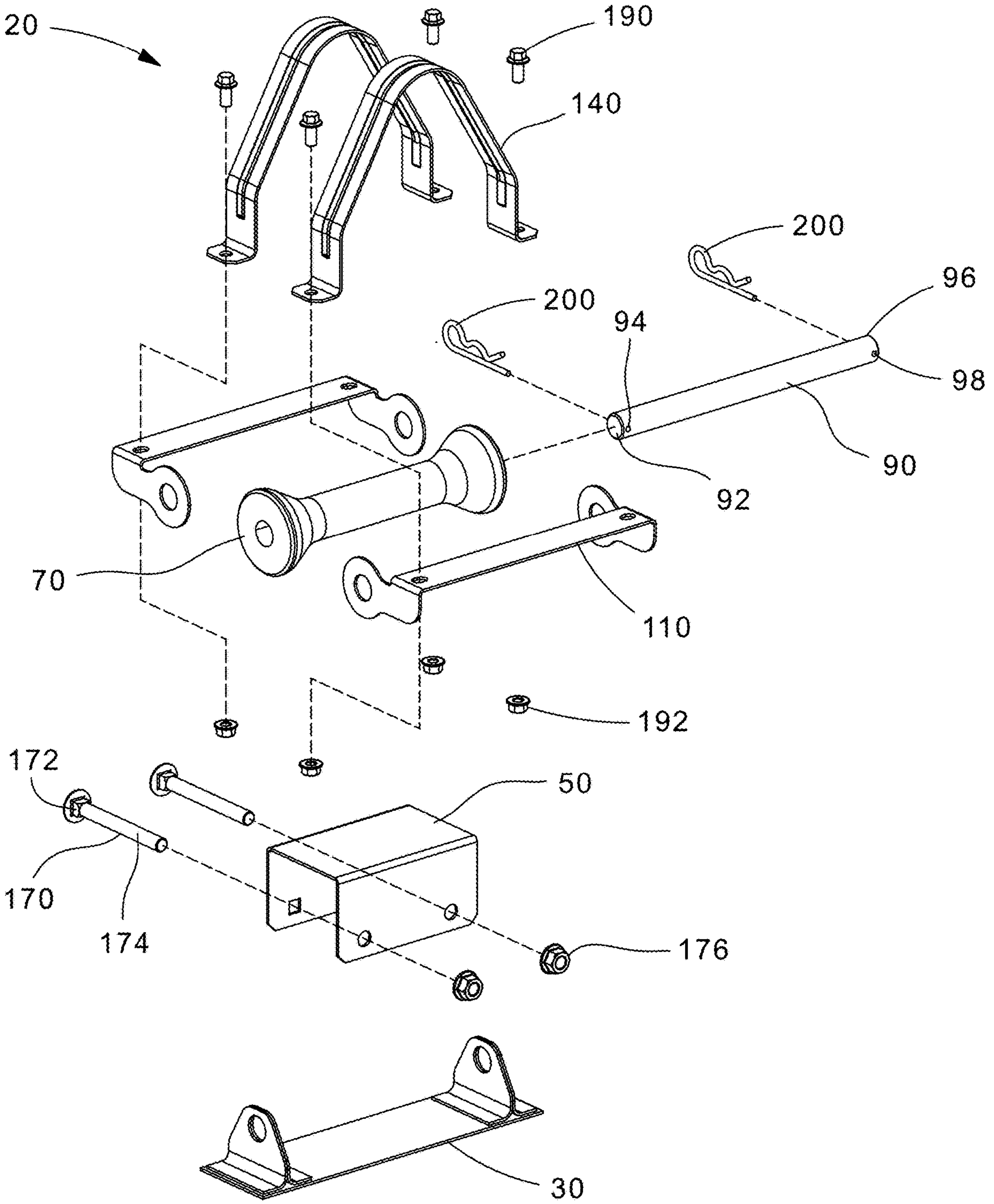
FIG. 3 is an exploded view of the high voltage cable cleat of FIG. 2.
Figure 4:
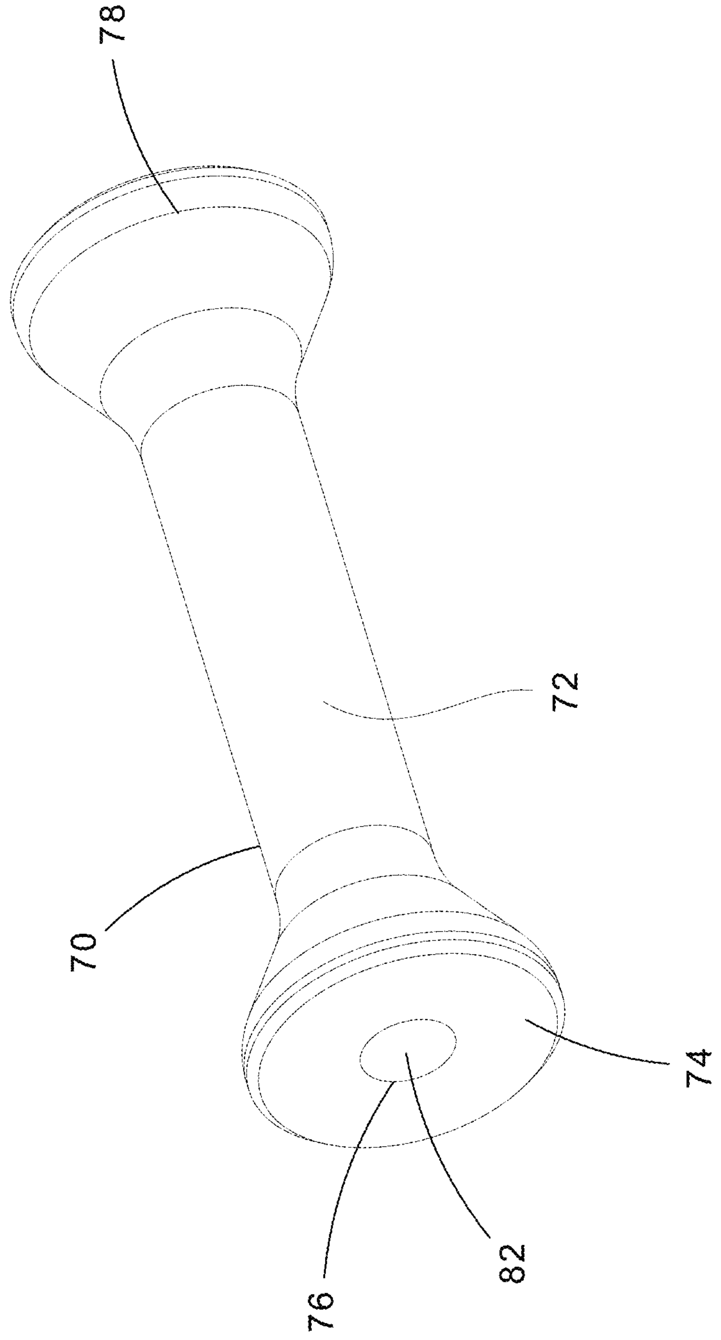
FIG. 4 is a perspective view of the roller of the high voltage cable cleat of FIG. 2.

FIG. 3 illustrates the components of the high voltage cable cleat 20 of the present invention. The cable cleat 20 includes a roller mount 30, a fixing bracket 50, a roller 70, lower clamps 110, and upper clamps 140. As illustrated in FIG. 4, the roller 70 is bar bell shaped with a cylindrical main body 72, a first end 74, and a second end 78. The first end 74 includes a center opening 76 that extends through the roller 70 to a center opening 80 (see FIG. 12) in the second end 78 defining a hollow center 82 through the roller 70. As illustrated in FIG. 3, a roller axle 90 is positioned to be installed in the hollow center 82 of the roller 70. The roller axle 90 includes a first end 92 with pin holes 94 and a second end 96 with pin holes 98. The roller axle 90 has a length that is longer than the length of the roller 70. As a result, when the roller axle 90 is positioned in the hollow center 82 of the roller 70, the pin holes 94 at the first end 92 and the pin holes

98 at the second end 96 of the roller axle 90 are accessible outside each end 74, 78 of the roller 70. As illustrated in FIG. 3 and described below, a locking pin 200 is installed in the pin holes 94, 98 at each end 92, 96 of the roller axle 90 to secure the roller 70 on the roller mount 30.

Figure 5B:
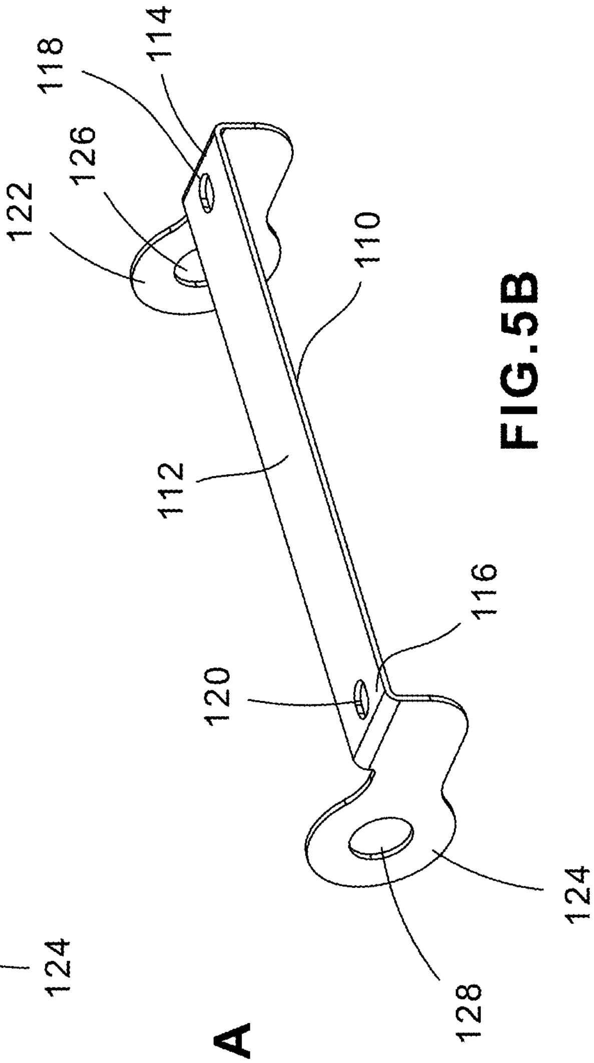
FIG. 5B is a perspective view of the right lower clamp of the high voltage cable cleat of FIG. 2.
Figure 5A:
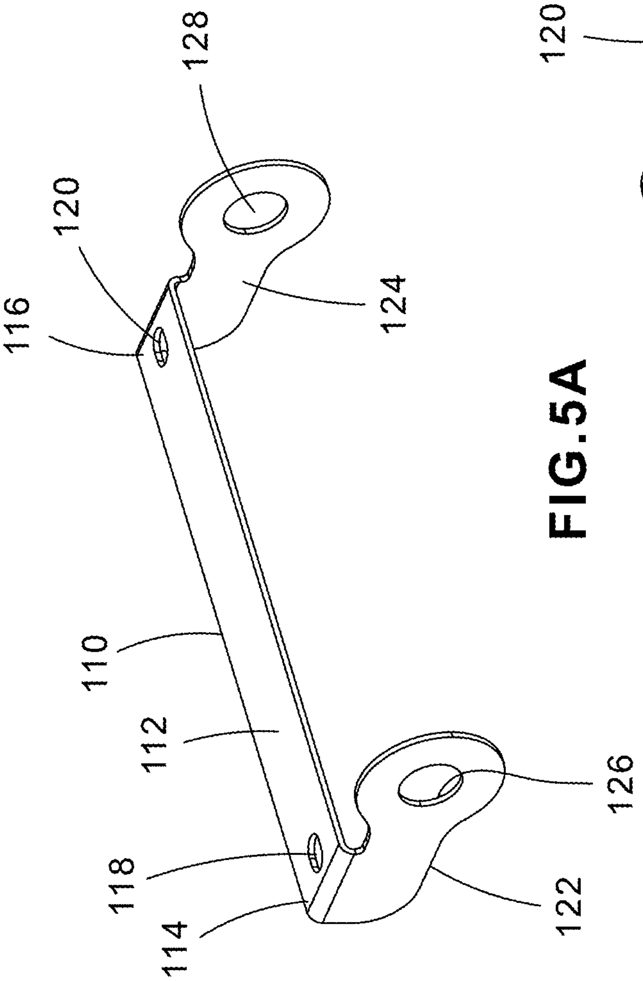
FIG. 5A is a perspective view of the left lower clamp of the high voltage cable cleat of FIG. 2.

FIGS. 5A and 5B illustrate the lower clamps 110. Each lower clamp 110 includes a contact member 112 with two opposing ends 114, 116 and attachment members 122, 124 extending from each opposing end 114, 116, respectively. The ends 114, 116 of the contact member 112 also include mounting holes 118, 120 for receiving a fastener 190 that secures the upper clamp 140 to the lower clamp 110, as seen in FIG. 2. The attachment members 122, 124 include a circular opening 126, 128 for receiving the roller axle 90 extending beyond the roller 70. The circular openings 126, 128 of adjacent attachment members 122, 124 of the lower clamps 110 align with each other as well as the center openings 76, 80 (see FIG. 12) in the roller 70 and the roller mount 30 to receive the roller axle 90 that extends through the roller 70.

Figure 6:
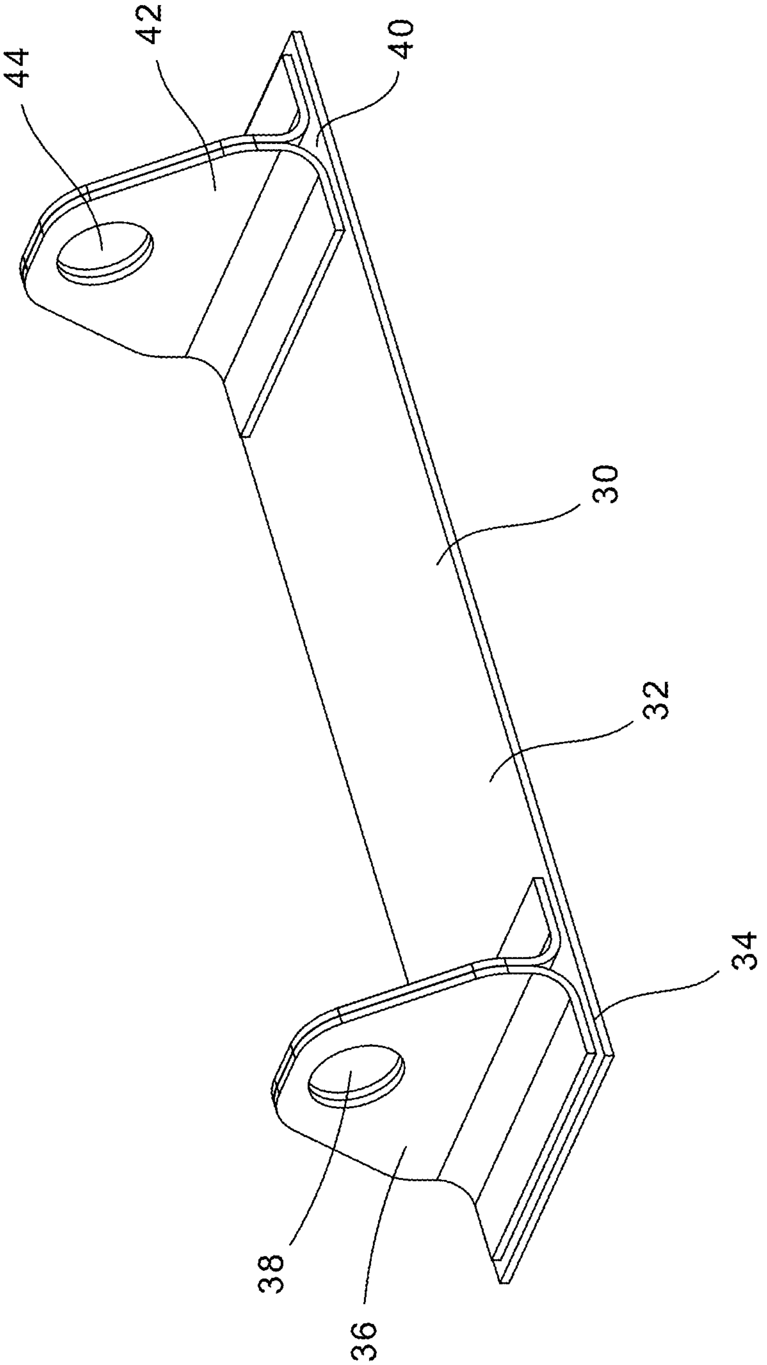
FIG. 6 is a perspective view of the roller mount of the high voltage cable cleat of FIG. 2.

As illustrated in FIG. 6, the roller mount 30 includes a base 32 with a first end 34 and a second end 40. A first set of arms 36 extends from the first end 34 and a second set of arms 42 extends from the second end 40. The first set of arms 36 are aligned and include a center opening 38 therethrough and the second set of arms 42 are aligned and include a center opening 44 therethrough. The center openings 38, 44 are designed to receive and support the roller axle 90 that extends through the roller 70 thereby enabling the roller 70 to be mounted to the roller mount 30.

Figure 7:
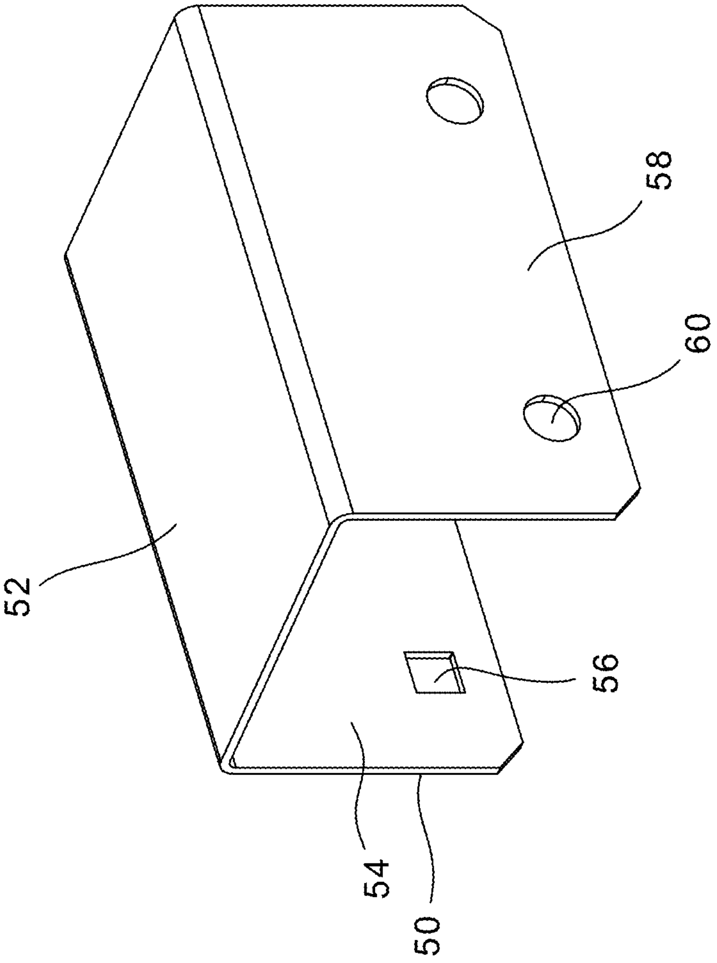
FIG. 7 is a perspective view of the fixing bracket of the high voltage cable cleat of FIG. 2.

FIG. 7 illustrates the fixing bracket 50 that secures the high voltage cable cleat 20 to a ladder rack or other surface. The fixing bracket 50 is C-shaped with a center 52 and opposing legs 54, 58. The first leg 54 includes a pair of square openings 56 for receiving the square head 172 of the fasteners 170 and the second leg 58 includes a pair of circular openings 60 for receiving the shafts 174 of the fasteners 170 to secure the fixing bracket 50 to a mounting surface. The fasteners 170 are secured to the fixing bracket 50 by nuts 176. The fixing bracket 50 is positioned over the roller mount 30 (see FIG. 2) before the fasteners 170, the roller 70, lower clamps 110, and upper clamps 140 are installed.

Figure 8:
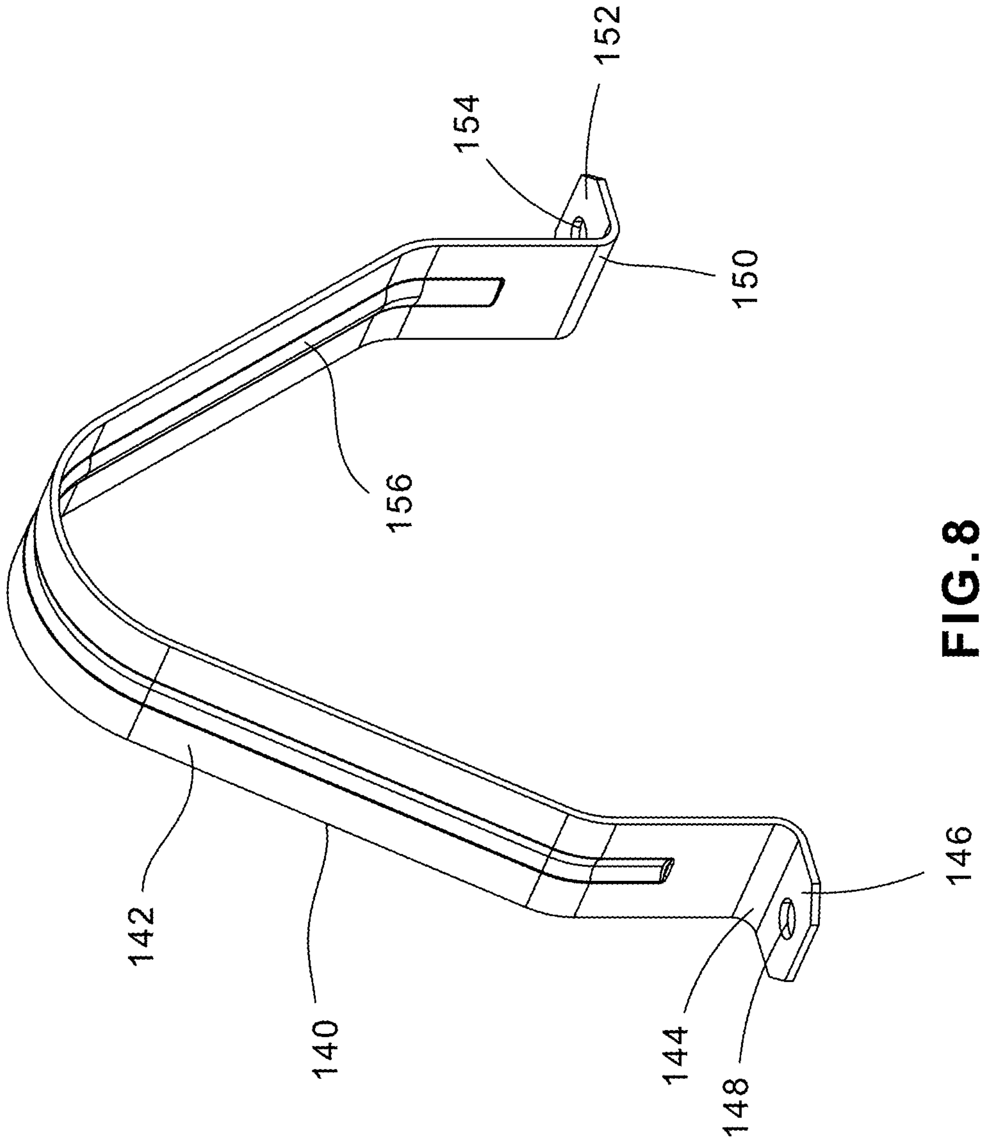
FIG. 8 is a perspective view of the upper clamp of the high voltage cable cleat of FIG. 2.
Figure 9:
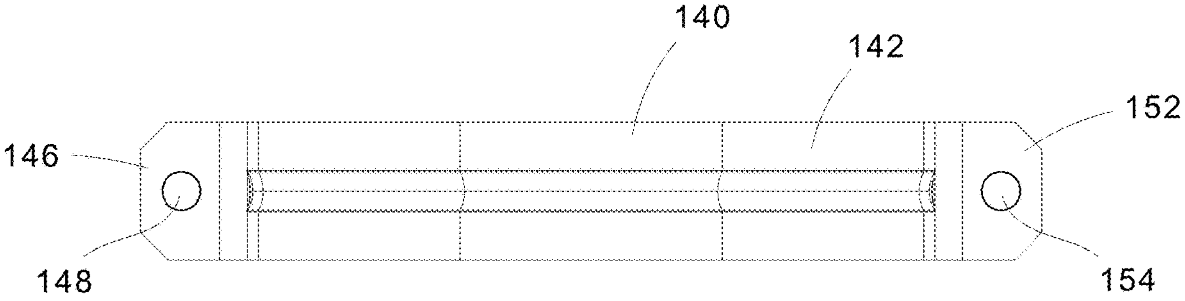
FIG. 9 is a top view of the upper clamp of the high voltage cable cleat of FIG. 8.
Figure 10:
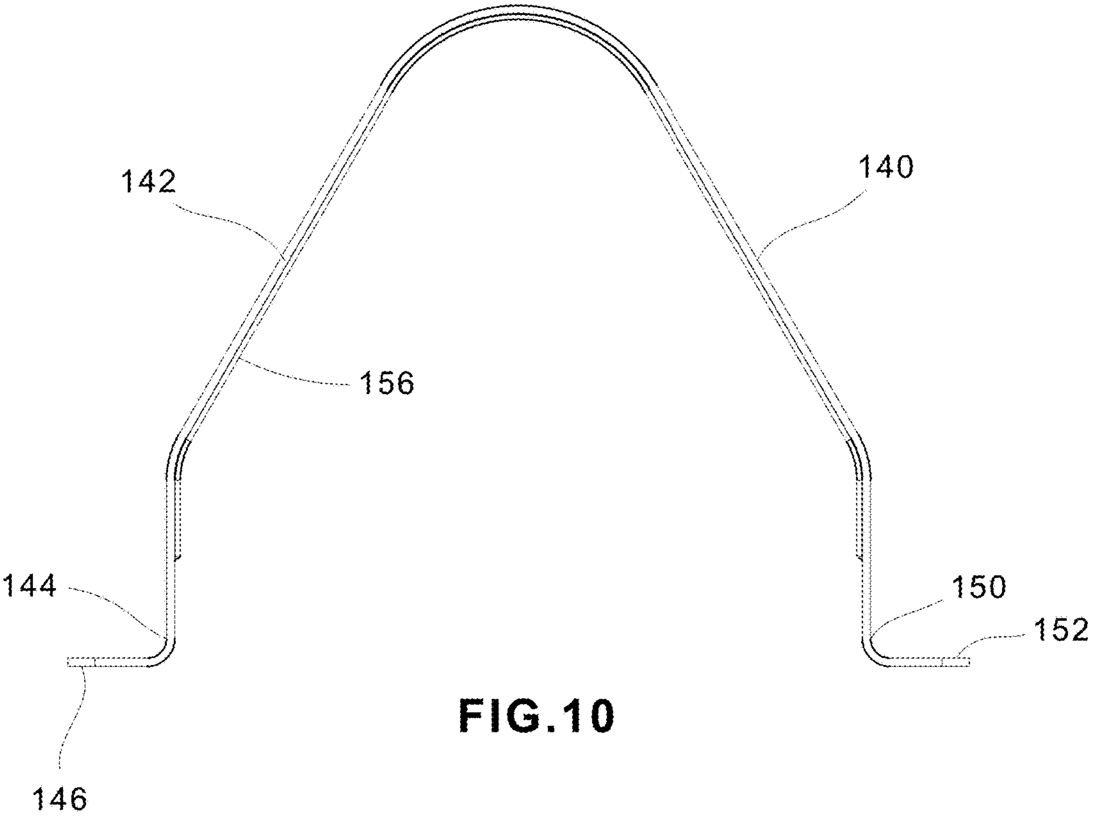
FIG. 10 is a front view of the upper clamp of the high voltage cable cleat of FIG. 8.

FIGS. 8-10 illustrate an upper clamp 140. The upper clamp 140 includes an arch shaped member 142 with a first end 144 and a second end 150. A mount member 146, 152 extends from the first end 144 and the second end 150, respectively. The mount members 146, 152 include a circular opening 148, 154, respectively, for receiving a fastener 190 to secure the upper clamp 140 to one of the lower clamps 110. The arch shaped member 142 is designed to fit over a trefoil cable configuration. The arch shaped member 142 includes an inwardly facing reinforcing dimple 156. The dimple 156 engages the cables when the upper clamp 140 is installed over the trefoil cable configuration.

Figure 11:
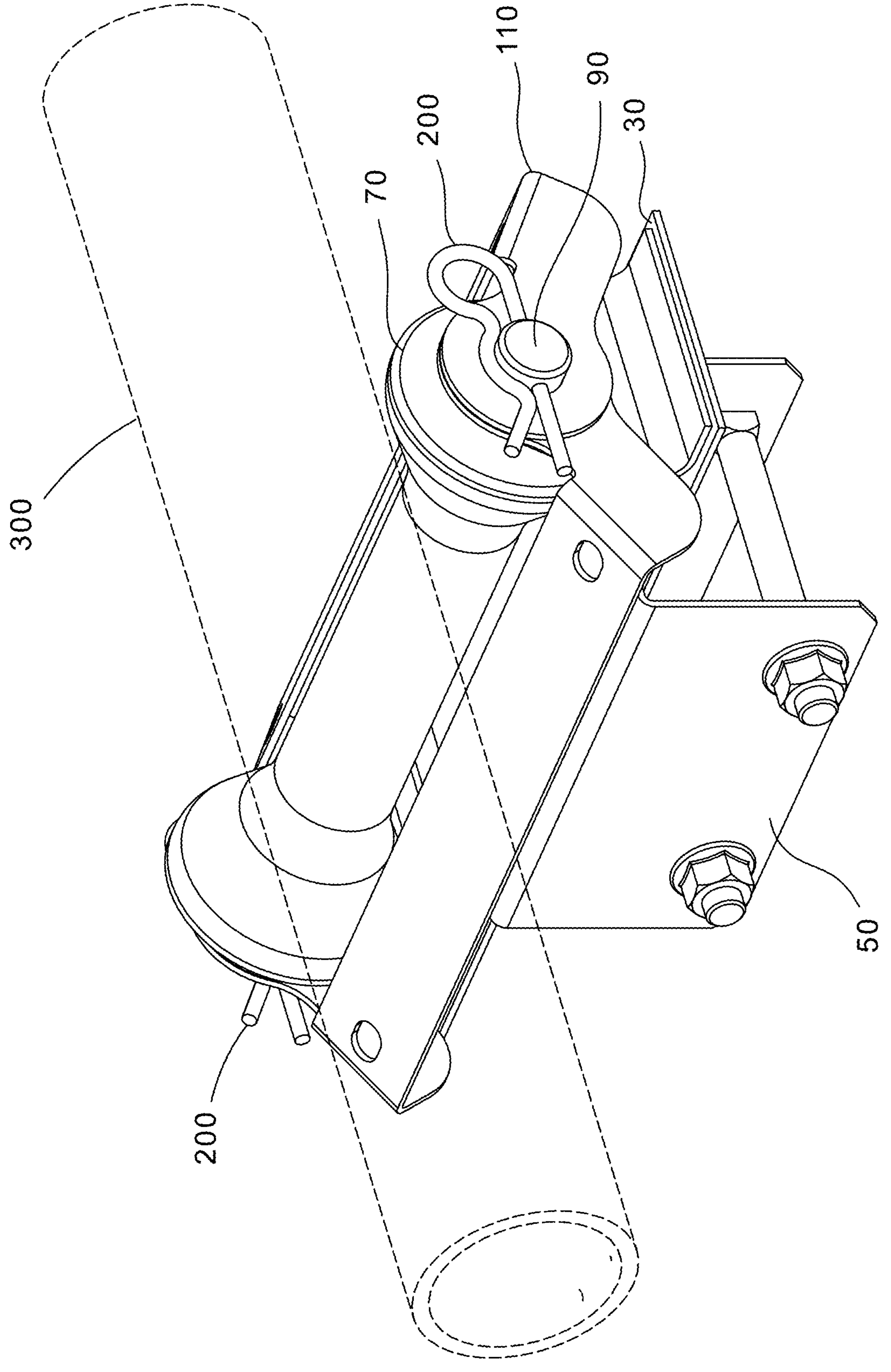
FIG. 11 is a perspective view of the high voltage cable cleat of claim 2 partially assembled with a cable positioned on the roller.

During cable installation, the cable cleat 20 is installed on a surface via the fixing bracket 50. As illustrated in FIGS. 11-12, two lower clamps 110 have been rotated downward to the initial installation position for cable installation. The lower clamps 110 are rotated into a position that allows unobstructed access for cables across the roller 70. As a result, the roller 70 can freely rotate and assist with cable pulling in the cable management system.

Once the cables have been placed in the desired position, the lower clamps 110 are rotated to an installed position where the contact member 112 of each lower clamp 110 engages the underside of the cables.

As illustrated in FIGS. 13-14, after the lower clamps 110 are rotated and positioned in the installed position, two upper clamps 140 are positioned over the cables 300. The upper clamps 140 are positioned with the circular opening 148, 154 of each mount member 146, 152 positioned over one of the holes 118, 120 at the ends 114, 116 of the contact member 112 of the lower clamps 110. A fastener 190 is installed through the aligned circular opening 148, 154 and holes 118, 120 and secured by a nut 192. As a result, the upper clamps 140 are secured to the lower clamps 110 in the installed position to form the cable cleat 20 of the present invention.

The cable cleat 20 of the present invention can be used in a high voltage application and submerged installations. The integral roller, removable upper clamps and the radial lower clamps accommodate any cable sag that could be present in the cable management system. The high voltage cable cleat of the present invention accommodates various cable configurations and is easy to install to a surface.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. A high voltage cable cleat for supporting cables, the high voltage cable cleat comprising:
- a roller with a main body, a first end, and a second end;
  - a roller axle positioned within the roller and extending beyond the first end and the second end of the roller;
- a roller mount receiving the roller axle and supporting the roller thereon;
- lower clamps rotatably mounted on the roller axle, wherein the lower clamps comprise a contact member with two opposing ends and attachment members extending from each opposing end; and
- upper clamps secured to the lower clamps.

2. The high voltage cable cleat of claim 1, wherein the lower clamps are rotated from an installation position that facilitates cable installation to an installed position.

3. The high voltage cable cleat of claim 1, wherein the first end of the roller includes a center opening and the second end of the roller includes a center opening, the center opening of the first end of the roller extends to the center opening at the second end of the roller defining a hollow center in the roller.

4. The high voltage cable cleat of claim 3, wherein the roller axle is positioned within the hollow center in the roller.

5. The high voltage cable cleat of claim 1, wherein the roller axle has a first end with pin holes and a second end with pin holes, whereby locking pins are positioned through the pin holes to secure the roller axle to the roller mount.

6. The high voltage cable cleat of claim 1, wherein the roller mount includes a base with a first end and a second end, a first set of arms with aligned center openings extends from the first end and a second set of arms with aligned center openings extends from the second end, wherein the aligned center openings of the first set of arms receive an end of the roller axle and the aligned center openings of the second set of arms receive an opposite end of the roller axle to mount the roller on the roller mount.

7. The high voltage cable cleat of claim 1, wherein the upper clamps comprise an arch shaped member with a first end and a second end, a first mount member with a circular opening extends from the first end, and a second mount member with a circular opening extends from the second end.

8. The high voltage cable cleat of claim 7, wherein the circular opening of the first mount member and the circular opening of the second mount member are positioned over holes at ends of the lower clamps, whereby fasteners are installed through the circular openings in the upper clamps and the holes at the ends of the lower clamps to secure the upper clamps to the lower clamps to form the cable cleat.

9. The high voltage cable cleat of claim 1, wherein the upper clamps include an inwardly facing dimple for engaging cable installed in the high voltage cable cleat.

10. The high voltage cable cleat of claim 1, wherein the ends of the contact member include mounting holes for receiving fasteners to secure the upper clamp to the lower clamp.

11. The high voltage cable cleat of claim 1, wherein the attachment members include circular openings for receiving the roller axle extending beyond the first end and the second end of the roller.

12. The high voltage cable cleat of claim 11, wherein the circular openings of the attachment members of adjacent lower clamps align with center openings in the roller and center openings in the roller mount to receive the roller axle extending beyond the first end and the second end of the roller.

13. The high voltage cable cleat of claim 1, further comprising a fixing bracket for securing the cable cleat to a surface, wherein the fixing bracket includes a center with opposing legs.

14. The high voltage cable cleat of claim 13, wherein one leg of the opposing legs include square openings for receiving square head fasteners and another leg of the opposing legs include circular openings for receiving shafts of the square head fasteners to secure the fixing bracket.

15. A method of installing a high voltage cable cleat with cables secured on the cable cleat, the method comprising:

providing a roller with a roller axle extending beyond a first end and a second end of the roller, wherein the roller axle is mounted to and extends beyond a roller mount to support the roller on the roller mount;

providing lower clamps positioned on the roller axle extending beyond the roller mount;

securing the roller axle to the roller mount with at least one locking pin; and rotating the lower clamps downward to an installation position to provide access to the roller supported by the roller mount.

16. The method of claim 15, comprising pulling cable on the high voltage cable cleat by rotating the roller mounted to the roller mount.

17. The method of claim 16, comprising rotating the lower clamps to an installed position with contact members of the lower clamps engaging an underside of the cable.

18. The method of claim 17, comprising positioning upper clamps over the cable; and securing the upper clamps to the lower clamps by fasteners.

19. The method of claim 15, comprising positioning a fixing bracket over the roller mount to secure the high voltage cable cleat to a surface.

* * * * *